United States Patent
Kajio (10) Patent No.: US 10,072,760 B2
(45) Date of Patent: Sep. 11, 2018

(54) FLUID CONTROL VALVE

(71) Applicant: AISIN SEIKI KABUSHIKI KAISHA, Kariya-shi, Aichi-ken (JP)

(72) Inventor: Katsuhiro Kajio, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/645,478

(22) Filed: Jul. 10, 2017

(65) Prior Publication Data

US 2018/0073642 A1 Mar. 15, 2018

(30) Foreign Application Priority Data

Sep. 9, 2016 (JP) .................................. 2016-177046

(51) Int. Cl.
| | |
|---|---|
| *F16K 1/36* | (2006.01) |
| *F16K 1/12* | (2006.01) |
| *F16K 1/42* | (2006.01) |
| *F16K 31/04* | (2006.01) |
| *H01M 8/04746* | (2016.01) |

(52) U.S. Cl.
CPC .................. *F16K 1/36* (2013.01); *F16K 1/12* (2013.01); *F16K 1/42* (2013.01); *F16K 31/04* (2013.01); *H01M 8/04753* (2013.01); *H01M 2250/20* (2013.01)

(58) Field of Classification Search
CPC ..... F16K 1/36; F16K 1/12; F16K 1/42; F16K 31/04; H01M 8/04753; H01M 2250/20
USPC ..................................... 251/318, 86, 84, 366
See application file for complete search history.

(56) References Cited

U.S. PATENT DOCUMENTS 1,584,975 A * 5/1926 Brenner .................... F01L 3/20
236/1 R
1,991,052 A * 2/1935 Derby ..................... F16K 27/08
137/797

(Continued)

FOREIGN PATENT DOCUMENTS

| JP | 2011-132974 A | 7/2011 |
| JP | 2013-87801 A | 5/2013 |

(Continued)

OTHER PUBLICATIONS

U.S. Appl. No. 15/645,418, filed Jul. 10, 2017, Katsuhiro Kajio.

*Primary Examiner* — John Bastianelli
(74) *Attorney, Agent, or Firm* — Buchanan Ingersoll & Rooney PC (57) ABSTRACT

A fluid control valve includes: a shaft member that moves along an axis of the shaft by a driving force from a driving source connected to one end of the shaft member; a holding member including a bottomed tubular portion into which the other end of the shaft member is inserted with a radial predetermined gap and which has a recess formed to be recessed radially inward from a surface of the tubular portion, and a valve body formed by fixing a sealing member to an outer periphery of a flat plate shaped main body portion that extends radially outward from the tubular portion; a housing that includes an inlet and an outlet of a fluid, has an annular valve seat on which the valve body abuts to block a communication between the inlet and the outlet, and accommodates the shaft member and the holding member.

5 Claims, 6 Drawing Sheets

(56) References Cited

U.S. PATENT DOCUMENTS

| | | | | | |
|---|---|---|---|---|---|
| 2,853,101 | A | * | 9/1958 | Williams | F16K 1/44 |
| | | | | | 137/446 |
| 2,875,975 | A | * | 3/1959 | Hajny | F16K 1/34 |
| | | | | | 251/358 |
| 2,919,884 | A | * | 1/1960 | Meusy | F16K 1/36 |
| | | | | | 251/129.2 |
| 3,417,668 | A | * | 12/1968 | Lawson | B60T 13/57 |
| | | | | | 137/596.2 |
| 3,486,522 | A | * | 12/1969 | Ashman | F16K 15/20 |
| | | | | | 137/234.5 |
| 3,511,260 | A | * | 5/1970 | Benjamin | F02P 5/103 |
| | | | | | 123/406.69 |
| 3,904,169 | A | * | 9/1975 | Cohn | F16K 27/0263 |
| | | | | | 251/223 |
| 4,531,498 | A | * | 7/1985 | Bradshaw | F02M 26/58 |
| | | | | | 251/86 |
| 4,597,558 | A | * | 7/1986 | Hafner | F02M 51/066 |
| | | | | | 239/585.1 |
| 4,633,901 | A | * | 1/1987 | Brandt | F02M 69/54 |
| | | | | | 123/463 |
| 2008/0073605 | A1 | | 3/2008 | Ishigaki et al. | |
| 2013/0092860 | A1 | * | 4/2013 | Kiku | F16K 1/36 |
| | | | | | 251/314 |

FOREIGN PATENT DOCUMENTS

| | | |
|---|---|---|
| JP | 2013-87802 A | 5/2013 |
| JP | 2013-087803 A | 5/2013 |
| JP | 2016-008683 A | 1/2016 |
| JP | 2016-13721 A | 1/2016 |

* cited by examiner

FLUID CONTROL VALVE

CROSS REFERENCE TO RELATED APPLICATIONS

This application is based on and claims priority under 35 U.S.C. § 119 to Japanese Patent Application 2016-177046, filed on Sep. 9, 2016, the entire contents of which are incorporated herein by reference.

TECHNICAL FIELD

This disclosure relates to a fluid control valve that controls a flow rate and a pressure of a fluid.

BACKGROUND DISCUSSION

In related art, there is known a poppet valve type fluid control valve that controls a flow rate of air supplied to various devices mounted on a vehicle (see, e.g., JP 2013-087803A (Reference 1)).

The fluid control valve of Reference 1 includes a shaft member ("valve shaft" in Reference 1) that moves along an axis by a driving force of a driving source, a holding member having a tubular portion into which the tip end of the shaft member is inserted with a radial predetermined gap and a valve body extending radially outward from the tubular portion ("valve frame" in Reference 1), and a housing ("valve housing" in Reference 1) having an annular valve seat on which the valve body abuts.

Further, a rotatable ball is disposed in a through hole provided on the tip end of the shaft member, and the ball is fixed by caulking the holding member such that the holding member is capable of swinging with respect to the shaft member. As a result, even in a case where the parallelism between the valve body and the valve seat is not constant due to a fluid pressure received by the valve body from a fluid or a dimensional error of components when the valve body is closed, the sealing member of the valve body is pressed against the valve seat over the entire circumference of the valve seat by applying a forward direction driving force to the shaft member.

However, in the fluid control valve of the related art, the sealing performance is high because the valve body swings with respect to the shaft member such that the sealing member of the valve body is pressed against the valve seat over the entire circumference. However, since the tip end of the shaft member is machined to form the through hole and dispose the ball therein, manufacturing costs increase. Further, since the ball or the space for accommodating the ball is provided, the axial length of the fluid control valve increases.

Thus, a need exists for a compact fluid control valve which is not susceptible to the drawback mentioned above.

SUMMARY

A feature of a fluid control valve resides in that the fluid control valve includes: a shaft member that moves along an axis of the shaft by a driving force from a driving source connected to one end of the shaft member; a holding member including a bottomed tubular portion into which the other end of the shaft member is inserted with a radial predetermined gap, and which has a recess formed to be recessed radially inward from a surface of the tubular portion, and a valve body formed by fixing a sealing member to an outer periphery of a flat plate shaped main body portion that extends radially outward from the tubular portion; a housing that includes an inlet and an outlet of a fluid, has an annular valve seat on which the valve body abuts to block a communication between the inlet and the outlet, and accommodates the shaft member and the holding member, wherein the other end of the shaft member includes a first region formed to be reduced in diameter toward a bottom portion of the tubular portion and including a first abutment portion abutting the bottom portion, and a second region formed to be reduced in diameter toward an opposite side to the bottom portion from a boundary surface with the first region and including a second abutment portion abutting the recess, and a distance from a center of the boundary surface to the first abutment portion is shorter than a distance from the center of the boundary surface to the second abutment portion.

A feature of a fluid control valve resides in that the fluid control valve includes: a shaft member that moves along an axis of the shaft by a driving force from a driving source connected to one end of the shaft member; a holding member including a bottomed tubular portion into which the other end of the shaft member is inserted with a radial predetermined gap, and which has a recess formed to be recessed radially inward from a surface of the tubular portion, and a valve body formed by fixing a sealing member to an outer periphery of a flat plate shaped main body portion that extends radially outward from the tubular portion; a housing that includes an inlet and an outlet of a fluid, has an annular valve seat on which the valve body abuts to block a communication between the inlet and the outlet, and accommodates the shaft member and the holding member, wherein the other end of the shaft member includes a diameter enlarged portion that is enlarged in diameter toward the bottom portion of the tubular portion and abuts on the recess, and a flat portion that is formed by making a tip end surface of the diameter enlarged portion flat, and the bottom portion has a convex portion that protrudes toward the flat portion from a surface of the bottom portion and abuts on the flat portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of the fluid control valve disclosed here will be described with reference to the drawings.

In the embodiments, an air pressure regulating valve 3 (an example of the fluid control valve) provided in an oxygen supply module 2 of a fuel cell system 1 will be described as an example of the fluid control valve. However, this disclosure is not limited to the embodiments, and various modifications may be made within a scope that does not depart from the gist of this disclosure.

Fuel Cell System

Figure 1:
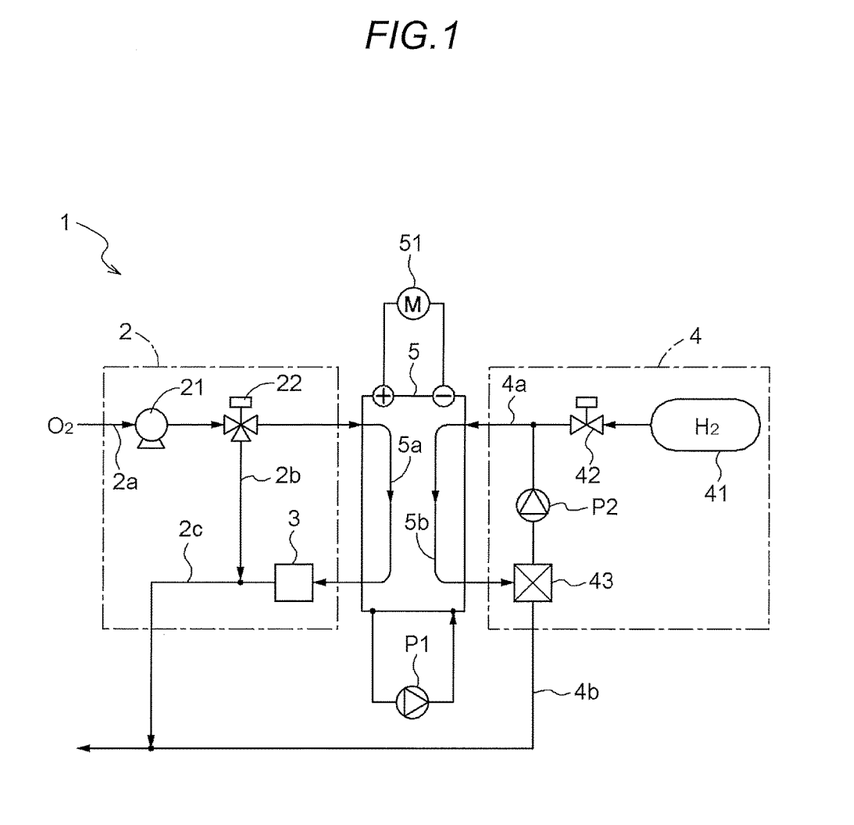
FIG. 1 is a schematic view illustrating a fuel cell system.

As illustrated in FIG. 1, in this embodiment, an electric motor 51 is used as a driving source of a vehicle such as an automobile or a general industrial machine. An electric power generated by the fuel cell system 1 is supplied to the electric motor 51. The fuel cell system 1 includes a fuel cell 5, the oxygen supply module 2 that supplies air to the fuel cell 5, and a fuel supply module 4 that supplies hydrogen gas to the fuel cell 5. In addition, when the electric power generated in the fuel cell 5 is supplied to the electric motor 51, a surplus electric power may be stored in a battery, and there is no specific limitation in this regard.

The fuel cell 5 is configured by laminating cell units, in which cells each having an electrolyte sandwiched between a fuel pole and an air pole are divided by separators, in series. An air flow path 5a is formed in the separator facing the air pole to cause oxygen-containing air to flow therein, and a hydrogen flow path 5b is formed in the separator facing the fuel pole to cause hydrogen gas to flow therein. In the fuel cell 5, the hydrogen gas becomes hydrogen ions to pass through the electrolyte and chemically react with oxygen so that water (steam) is generated, and the side of the fuel pole becomes a negative pole, and the side of the air pole becomes a positive pole so that an electric power is supplied to the electric motor 51. In addition, cooling water is circulated by a water cooling pump P1 in order to cool the fuel cell 5.

The oxygen supply module 2 includes an air supply path 2a to supply the oxygen-containing air to the fuel cell 5 by a compressor 21. The air supply path 2a is connected to the air flow path 5a of the fuel cell 5, and a cross valve 22 is disposed between the compressor 21 and the air flow path 5a. One end of a bypass flow path 2b is connected to the cross valve 22, and the other end of the bypass flow path 2b is connected to an oxygen-side discharge path 2c. By displacing the valve position of the cross valve 22, a part of the air is discharged to the oxygen-side discharge path 2c via the bypass flow path 2b so as to regulate the amount of the air supplied to the air flow path 5a of the fuel cell 5. Further, although an air filter that removes foreign matters contained in the air or an intercooler that cools the air compressed by the compressor 21 is appropriately installed in the air supply path 2a, illustration thereof is omitted.

One end of the oxygen-side discharge path 2c is connected to the outlet of the air flow path 5a of the fuel cell 5, and the other end thereof is joined with a fuel-side discharge path 4b to be described later. The air that is not used for the generation or the water (steam) generated by the generation is discharged from the oxygen-side discharge path 2c. In the present embodiment, the air pressure regulating valve 3 is disposed on the oxygen-side discharge path 2c, and installed between the outlet of the air flow path 5a of the fuel cell 5 and the other end of the bypass flow path 2b. Although the detailed configuration of the air pressure regulating valve 3 will be described later, the air pressure regulating valve 3 controls the internal pressure of the fuel cell 5 by regulating the discharge amount of the air remaining inside the fuel cell 5.

The fuel supply module 4 includes a hydrogen supply flow path 4a that supplies hydrogen gas from a hydrogen tank 41 to the hydrogen flow path 5b of the fuel cell 5. In the hydrogen supply flow path 4a, a cutoff valve 42 is provided to cut off the supply of the hydrogen gas when the operation of the vehicle is stopped. Further, a fuel-side discharge path 4b is connected to the outlet of the hydrogen flow path 5b to discharge nitrogen mainly transmitted from the air pole and containing a small amount of hydrogen gas, or the water (steam) transmitted through the electrolyte.

A gas-liquid separator 43 is provided on the fuel-side discharge path 4b, and the hydrogen gas and water are separated by the gas-liquid separator 43. The hydrogen gas separated by the gas-liquid separator 43 is circulated in the downstream side of the hydrogen supply flow path 4a from the cutoff valve 42 by a circulation pump P2, and used again as the fuel of the fuel cell 5. Meanwhile, the water separated by the gas-liquid separator 43 or the hydrogen gas that is not used for the circulation is discharged to the fuel-side discharge path 4b, and mixed with air or water flowing into the fuel-side discharge path 4b from the oxygen-side discharge path 2c so as to be discharged to the outside. Further, in the fuel-side discharge path 4b, a drain valve that adjusts the discharge amount of the gas-liquid separator 43 or a diluter that dilutes the hydrogen gas at the joining portion with the oxygen-side discharge path 2c with air is appropriately provided, but illustration thereof is omitted.

The fuel cell system 1 is configured such that, when the vehicle starts its operation, oxygen-containing air is supplied to the air flow path 5a by the compressor 21, and the hydrogen gas is supplied to the hydrogen flow path 5b by opening the cutoff valve 42 and operating the circulation pump P2 so that the fuel cell 5 generates power. At this time, the air pressure regulating valve 3 is in the opened state to control the internal pressure of the fuel cell 5 by discharging the air remaining inside the fuel cell 5 (see FIG. 2). Meanwhile, in the fuel cell system 1, when the vehicle stops its operation, the compressor 21 is stopped so that the supply of the air to the air flow path 5a is stopped, and the cutoff valve 42 is closed and the circulation pump P2 is stopped so that the supply of the hydrogen gas to the hydrogen path 5b is stopped. At this time, the air pressure regulating valve 3 is in the closed state (see FIG. 3).

Fluid Control Valve

Next, the configuration of the air pressure regulating valve 3 as the fluid control valve according to the present embodiment will be described with reference to FIGS. 2 to 7. Although descriptions will be made using the vertical direction and the horizontal direction (the lateral side) based on the plane of the sheet of FIG. 2, the directions may not be necessarily consistent with the actual mounting directions of the air pressure regulating valve 3.

Figure 2:
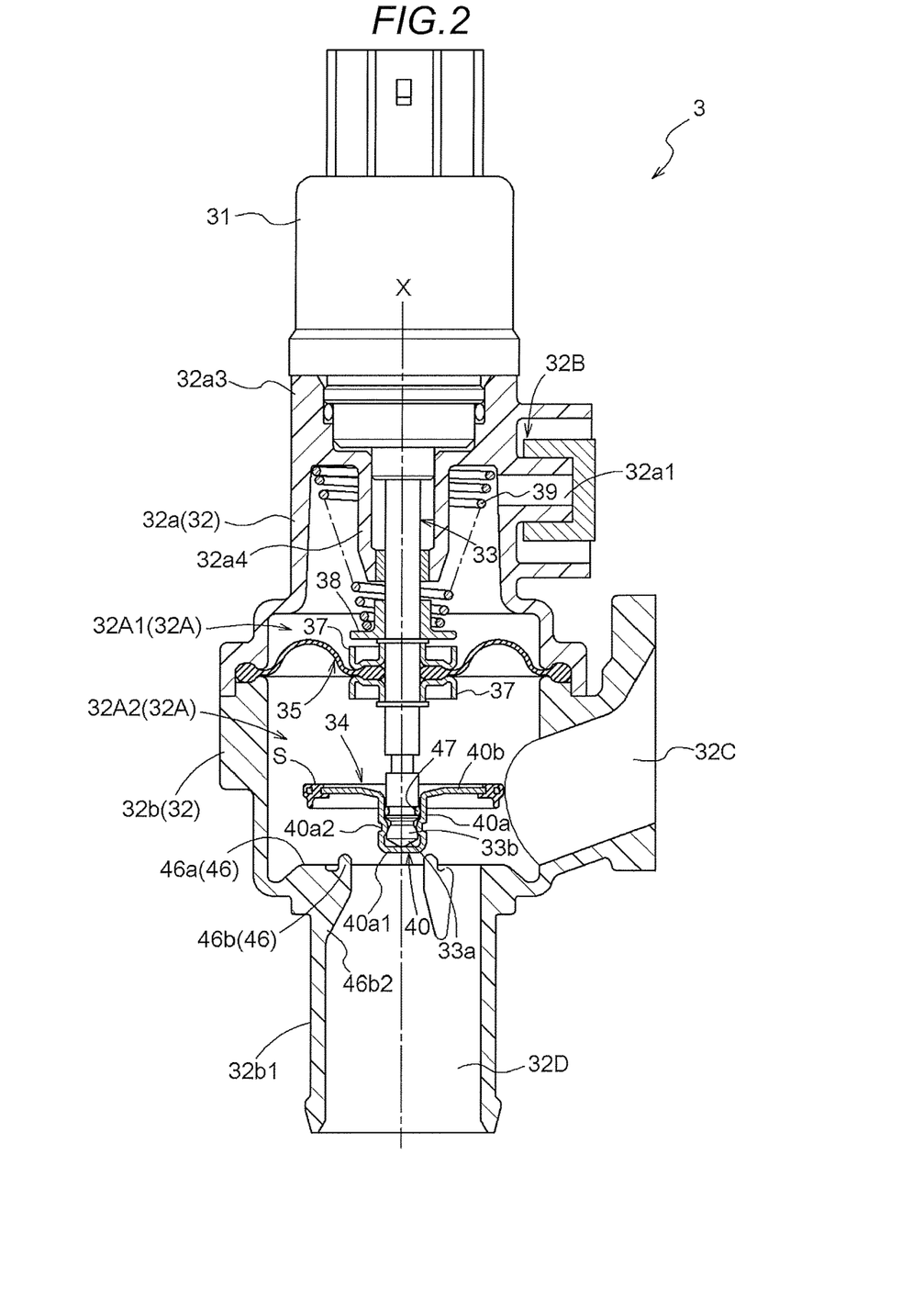
FIG. 2 is a cross-sectional view illustrating the fluid control valve at the valve opening time.
Figure 3:
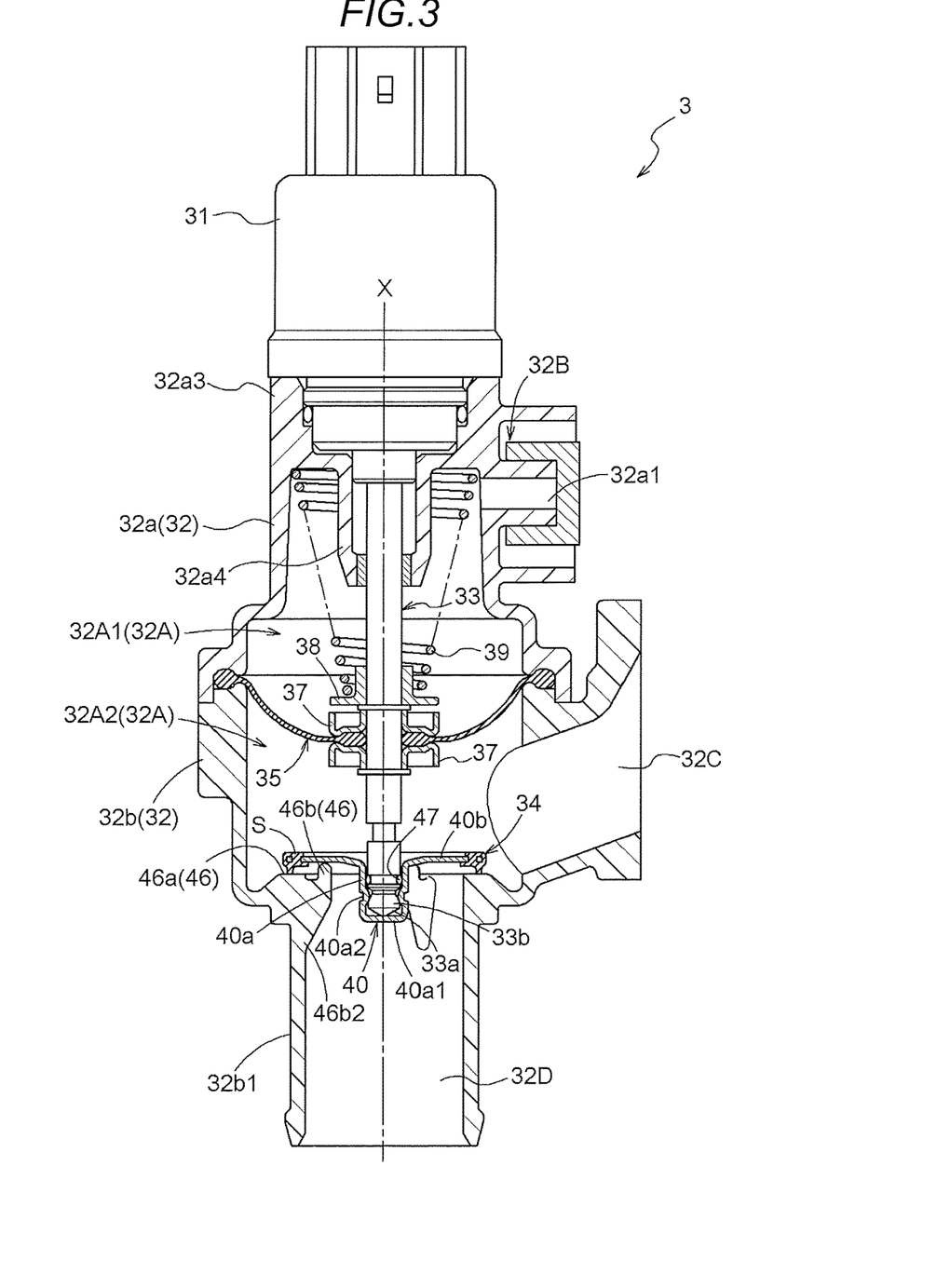
FIG. 3 is a cross-sectional view illustrating the fluid control valve at the valve closing time.

As illustrated in FIG. 2, the air pressure regulating valve 3 includes a stepping motor 31 (an example of the driving source), a metal shaft member 33 that moves along the axis X by a driving force from the stepping motor 31 connected to one end of the shaft member 33, a valve body 34 connected to the other end of the shaft member 33, and a resin housing 32 that is formed by connecting an upper housing 32a and a lower housing 32b to each other and accommodates the shaft member 33 and the valve body 34.

The stepping motor 31 is fixed to the upper housing 32a in a sealing state, and configured such that, when an output axis is rotated by a screw mechanism provided on the output axis, the shaft member 33 supported to the stepping motor 31 in a rotation stopped state moves vertically along the axis X. The stepping motor 31 is capable of finely setting the moving distance of the shaft member 33 by adjusting a step angle according to the number of pulses to be applied. Since the stepping motor 31 is well-known, detailed description thereof will be omitted. In addition, the driving source is not limited to the stepping motor 31, and may be configured by, for example, a brushless motor capable of controlling a rotation angle.

The shaft member 33 is formed in a bar shape having one end to which the stepping motor 31 is connected, and the other end to which the valve body 34 is connected. A diaphragm 35 is provided in the middle of the shaft member 33, and the inner peripheral side thereof is held by a fixing member 37. The diaphragm 35 is formed by fixing a rubber material to a base fabric. A retainer 38 is disposed above the fixing member 37, and a compression spring 39 is provided between the retainer 38 and the upper housing 32a. The compression spring 39 presses the valve body 34 in the valve closing direction, and when the operation of the vehicle is stopped, the valve body 34 is held in the closed state by the pressing force of the compression spring 39 (see FIG. 3).

A holding member 40 is mounted on the other end of the shaft member 33, and includes a bottomed tubular portion 40a into which the other end of the shaft member 33 is inserted in a state of having a radial predetermined gap "m," a flat plate shaped main body portion 40b that extends radially outward from the opening of the tubular portion 40a, and a sealing member S that is fixed to the outer periphery of the main body portion 40b. The holding member 40 is made of a metal. Specifically, the tubular portion 40a and the main body portion 40b are made of a metal material, and the sealing member S is made of a rubber material. The valve body 34 connected to the other end of the shaft member 33 is configured with the main body portion 40b which is a portion of the holding member 40, and the sealing member S fixed to the outer periphery of the main body portion 40b. In the present embodiment, the external surface of the tubular portion 40a is press-processed (caulked) in a state where the other end of the shaft member 33 is inserted into the tubular portion 40a (see FIG. 5). Accordingly, a plurality of recesses 40a2 (two opposite locations) are formed as caulked portions on the tubular portion 40a to be recessed radially inward from the surface of the tubular portion 40a (see FIG. 4).

Figure 4:
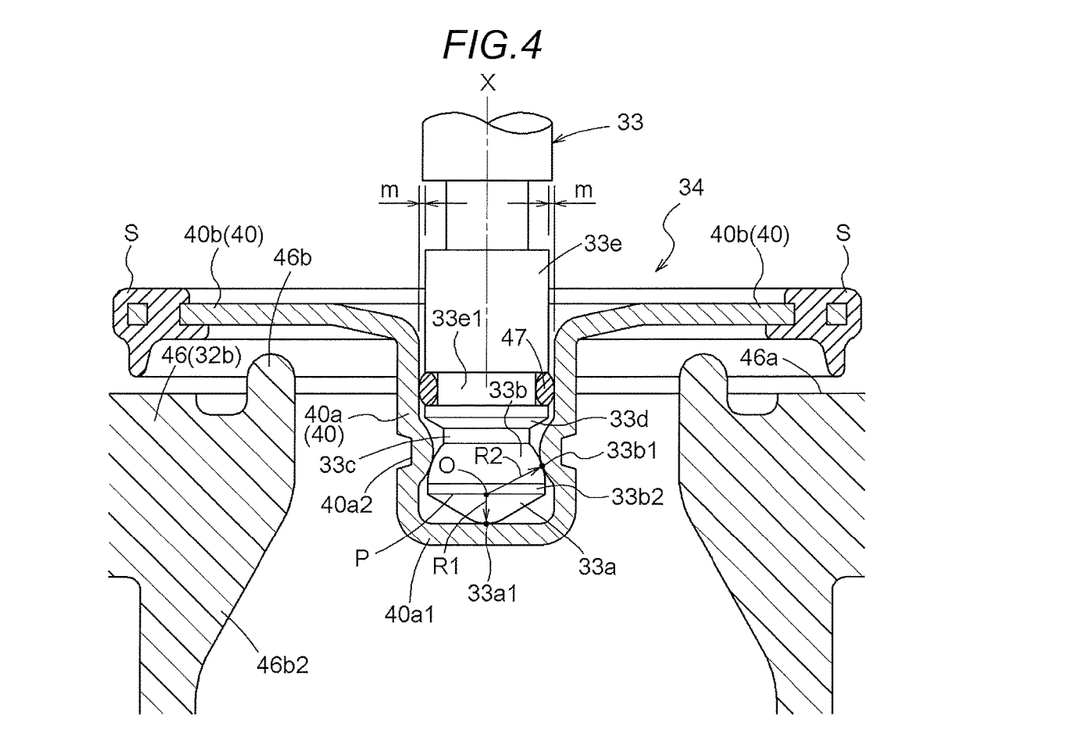
FIG. 4 is an enlarged view of the other end of a shaft member.
Figure 5:
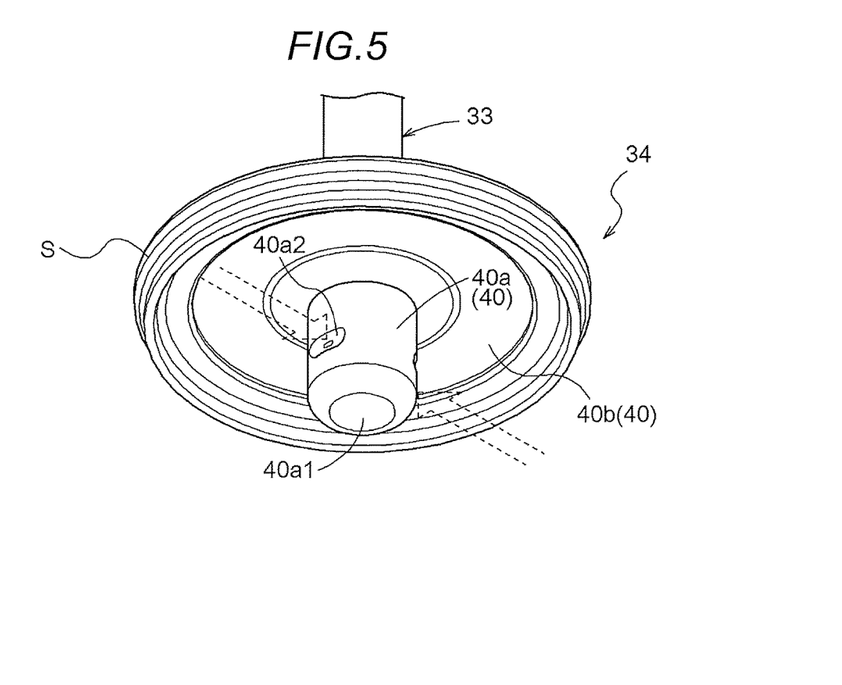
FIG. 5 is a perspective view of the fluid control valve in a state where the shaft member is exposed.

As illustrated in FIG. 4, the other end of the shaft member 33 includes a first region 33a, a second region 33b, a third region 33c, a fourth region 33d, and a fifth region 33e in this order from the tip end side of the shaft member 33 (the bottom portion 40a1 side of the tubular portion 40a).

The first region 33a is formed in a conical shape that is reduced in diameter toward the bottom portion 40a1 of the tubular portion 40a, and has a first abutment portion 33a1 that abuts on the bottom portion 40a1 of the tubular portion 40a. Further, the tip end of the first region 33a is formed in a spherical shape.

The second region 33b is formed in a hemispherical shape that is reduced in diameter toward the opposite side to the bottom portion 40a1 of the tubular portion 40a from the boundary surface P with the first region 33a. By causing the recess 40a2 of the tubular portion 40a to abut on a second abutment portion 33b1 of the second region 33b, the holding member 40 is held in a state of being suppressed from slipping off from the shaft member 33 in the direction of the axis X. Further, a transition portion 33b2 is formed in the second region 33b to linearly transit from the boundary surface P with the first region 33a to the portion having a predetermined curvature. The transition portion 33b2 may be omitted, and the external surface of the second region 33b may be entirely formed by the curved surface.

The length of the first region 33a in the direction of the axis X is shorter than the radius of the second region 33b. In other words, the distance R1 from the center O of the boundary surface P to the first abutment portion 33a1 is shorter than the distance R2 from the center O of the boundary surface P to the second abutment portion 33b1. Since the first region 33a and the second region 33b may be easily formed by cutting the other end of the shaft member 33 through lathe-machining or the like, manufacturing costs may be reduced. Further, since the length of the first region 33a is short, the axial length of the shaft member 33 is reduced so that the air pressure regulating valve 3 may be made compact.

The third region 33c is formed in a columnar shape that is continuous to the shortest diameter portion of the second region 33b. The fourth region 33d has a tapered surface that is enlarged in diameter toward the opposite side to the bottom portion 40a1 from the connection portion with the third region 33c. The fifth region 33e is formed in a columnar shape that is continuous to the longest diameter portion of the fourth region 33d, and has a groove portion 33e1 formed by recessing a part of the fifth region 33e. A rubber O-ring 47 is fitted in the groove portion 33e1 and compressed by being in contact with the outer surface of the shaft member 33 and the inner surface of the tubular portion 40a. That is, the O-ring 47 is provided between the shaft member 33 and the tubular portion 40a on the opposite side to the bottom portion 40a1 of the tubular portion 40a from the second abutment portion 33b1.

As described above, since the other end of the shaft member 33 is inserted into the tubular portion 40a in the state of having the radial predetermined gap "m," the holding member 40 (the valve body 34) is capable of swinging in a predetermined range with respect to the shaft member 33 while the first region 33a and the second region 33b come into sliding-contact with the inner surface of the tubular portion 40a. In addition, without being limited to the configuration in which the holding member 40 swings with respect to the shaft member 33, the shaft member 33 itself to which the holding member 40 is fixed may swing.

Referring back to FIGS. 2 and 3, the housing 32 is configured by fastening and fixing the upper housing 32a and the lower housing 32b to each other with bolts in a state where the outer peripheral side of the diaphragm 35 is clamped on the connection surface between the upper housing 32a and the lower housing 32b. In an accommodating space 32A of the housing 32, the above-described shaft member 33, valve body 34, diaphragm 35, compression spring 39, and others are accommodated.

A through hole 32a1 is formed on the lateral surface of the upper housing 32a to communicate an upper chamber 32A1 divided and formed by the diaphragm 35 and the upper housing 32a, and an external space 32B with each other. Accordingly, the upper chamber 32A1 is kept at the atmospheric pressure. Further, when the valve body 34 is in the closed state, a lower chamber 32A2 is formed in the space surrounded by the valve body 34, the lower housing 32b, and the diaphragm 35 to communicate with an inlet 32C (see FIG. 3).

A tubular wall 32a4 is formed at the upper portion of the upper housing 32a to extend downward (toward the valve body 34) in a tubular shape from a motor fixing portion 32a3 that fixes the stepping motor 31, and one end side of the shaft member 33 is supported to the tubular wall 32a4.

The lower housing 32b includes the inlet 32C into which air or water (steam) from the outlet of the air flow path 5a of the fuel cell 5 flows, and an outlet 32D from which the air or water (steam) flows out to the downstream side of the oxygen-side discharge path 2c when the valve body 34 is opened. In the present embodiment, the inlet 32C is formed to be opened at the lateral side of the lower housing 32b, and the outlet 32D is formed to be opened at the bottom side of the lower housing 32b.

An annular valve seat 46 is formed in the lower housing 32b such that the valve body 34 abuts on the valve seat 46 to block a communication between the inlet 32C and the outlet 32D. The valve seat 46 includes an abutment portion 46a on which the sealing member S of the valve body 34 abuts, and a protruding portion 46b that protrudes upward (toward the main body portion 40b) from the abutment portion 46a in a state of extending radially inward from the abutment portion 46a. The abutment portion 46a is configured by the flat surface that becomes the ceiling of a peripheral wall portion 32b1 constituting the outlet 32D in the lower housing 32b. The protruding portion 46b protrudes upward (toward the valve body 34) from a base end portion 46b2 extending radially inward in a tapered shape from the peripheral wall portion 32b1 constituting the outlet 32D in the lower housing 32b. Further, a plurality of protruding portions 46b are provided at equal intervals along the circumferential direction of the valve seat 46, and the protruding portions 46b are separated from each other along the circumferential direction. Accordingly, in the state where the sealing member S abuts on the abutment portion 46a, the tip end 46b1 of the protruding portion 46b abuts on the main body portion 40b of the valve body 34 so that the movement of the valve body 34 is regulated (see FIG. 7).

Figure 6:
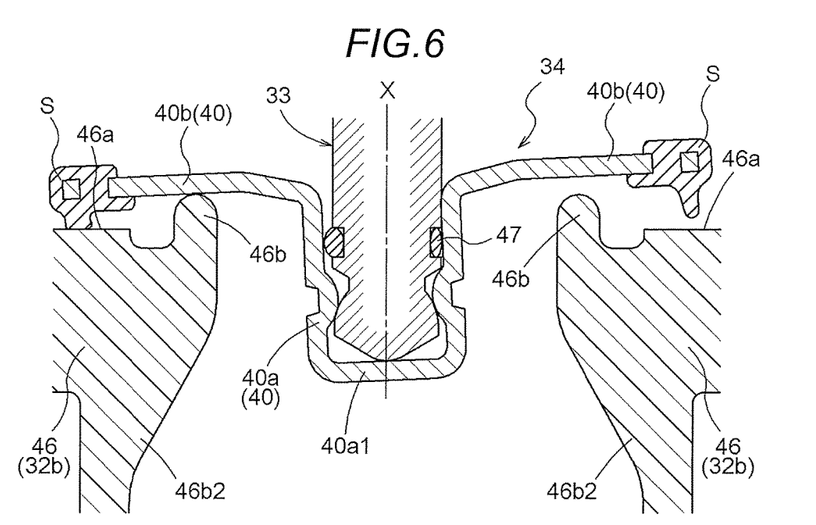
FIG. 6 is an enlarged view of the shaft member in a state where the valve closing is started.

When the valve body 34 is closed, the parallelism between the valve body 34 and the valve seat 46 may not be constant due to the fluid pressure received by the valve body 34 from the fluid or the dimensional error of the components. Thus, for example, as illustrated in FIG. 6, when the shaft member 33 connected to the valve body 34 at the other end thereof is moved along the axis X, the sealing member S on one side (the left side) is pressed against the abutment portion 46a. At this time, the valve body 34 is in a state of being tilted to the shaft member 33 such that the right gap "m" is narrowed.

Figure 7:
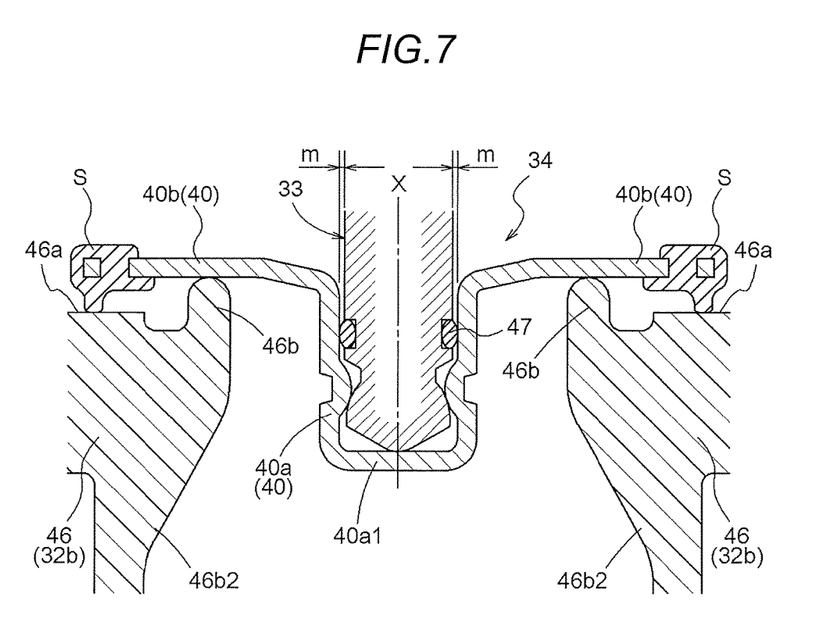
FIG. 7 is an enlarged view of the shaft member in a state where the valve closing is completed.

Subsequently, when the stepping motor 31 causes the driving force for further moving the shaft member 33 downward to act on the shaft member 33, the valve body 34 is corrected to be in the horizontal position with respect to the valve seat 46 based on the left protruding portion 46b as a fulcrum, as illustrated in FIG. 7. That is, the first abutment portion 33a1 of the first region 33a moves and slides on the bottom portion 40a1 of the tubular portion 40a, and the second abutment portion 33b1 of the second region 33b moves and slides on the recesses 40a2 at the two opposite locations, such that the tubular portion 40a and the shaft member 33 have the gap "m" therebetween.

At this time, in the present embodiment, since the tip end of the first region 33a is formed in a spherical shape, and the second region 33b is formed in a hemispherical shape, the first region 33a and the second region 33b smoothly move and slide, so that the posture of the valve body 34 is reliably corrected to be parallel with respect to the valve seat 46. As a result, since the sealing member S of the valve body 34 is evenly pressed over the entire circumference of the valve seat 46, the sealing performance may be improved.

In addition, as in the present embodiment, when the O-ring 47 is provided between the shaft member 33 and the tubular portion 40a on the opposite side to the bottom portion 40a1 of the tubular portion 40a from the second contact portion 33b1, foreign matters do not penetrate into the inner surface of the tubular portion 40a, and thus, the swinging of the valve body 34 with respect to the shaft member 33 is not hindered by the foreign matters. As a result, the posture of the valve body 34 may be corrected over a long period of time even when the valve body 34 is repeatedly closed. Further, since the O-ring 47 has also a shock absorbing function to suppress the inner surface of the tubular portion 40a and the outer surface of the shaft member 33 from strongly abutting with each other when the holding member 40 is tilted to the shaft member 33, noise and vibration may be reduced. Further, since the O-ring 47 has also an axis aligning function to correct the valve body 34 to be in the parallel posture with respect to the valve seat 46 by the own elastic force, the tilting of the valve body 34 may be suppressed when the valve body 34 is in the opened state.

Other Embodiments (a) Another Embodiment 1

Figure 8:
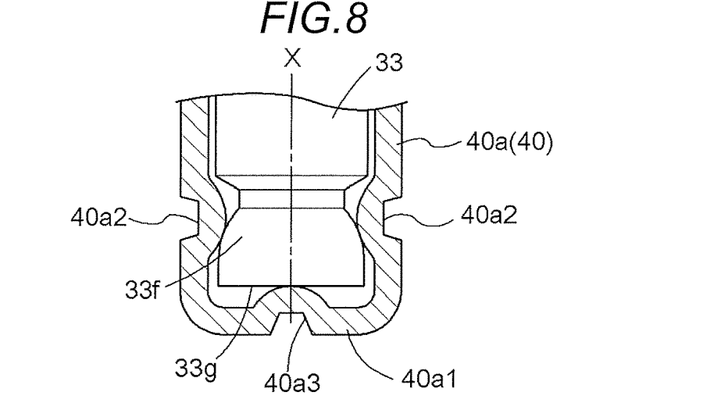
FIG. 8 is an enlarged view of a shaft member according to Another Embodiment 1.

As illustrated in FIG. 8, the other end of the shaft member 33 has a diameter enlarged portion 33f that is enlarged in diameter toward the bottom portion 40a1 of the tubular portion 40a and abuts on the recess 40a2, and a flat portion 33g formed by making the tip end surface of the diameter enlarged portion 33f flat. Further, the tubular portion 40a has a convex portion 40a3 that protrudes toward the flat portion 33g from the surface of the tubular portion 40a and abuts on the flat portion 33g. The other end of the shaft member 33 is formed by lathe-machining or the like, and the convex portion 40a3 is formed by press-processing the bottom portion 40a1 of the tubular portion 40a. The same acting effects as described above are also obtained in the present embodiment, and especially, since the tip end of the other end of the shaft member 33 is configured by the flat portion 33g, the axial length of the air pressure regulating valve 3 may be reduced.

(b) Another Embodiment 2

Figure 9:
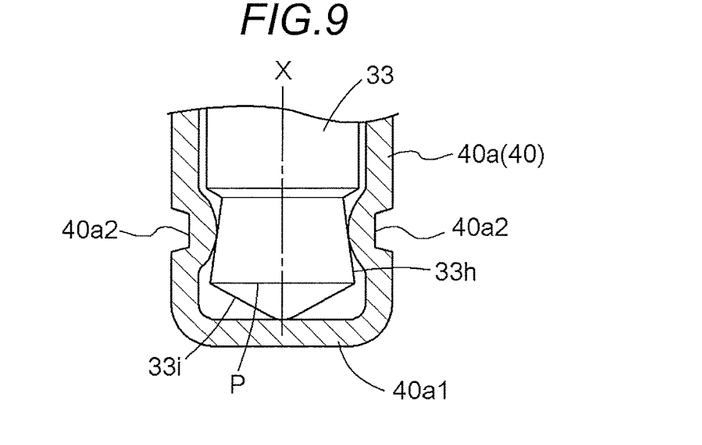
FIG. 9 is an enlarged view of a shaft member according to Another Embodiment 2.

As illustrated in FIG. 9, the other end of the shaft member 33 may have a first region 33i formed in a conical shape that is reduced in diameter toward the bottom portion 40a1 of the tubular portion 40a, and a second region 33h formed in a tapered shape that is reduced in diameter toward the opposite side to the bottom portion 40a1 of the tubular portion 40a from the boundary surface P with the first region 33i. This embodiment is different from the above-described embodiment in that the second region 33h in the tapered shape is provided, instead of the second region 33b in the hemispherical shape. The same acting effects as described above are also obtained in the present embodiment.

(c) Another Embodiment 3

Figure 10:
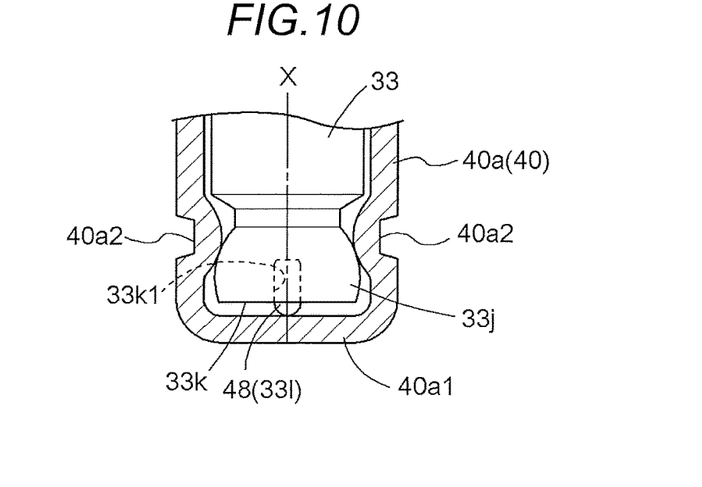
FIG. 10 is an enlarged view of a shaft member according to Another Embodiment 3.

As illustrated in FIG. 10, the other end of the shaft member 33 has a diameter enlarged portion 33j that is enlarged in diameter toward the bottom portion 40a1 of the tubular portion 40a and abuts on the recess 40a2, a flat portion 33k formed by making the tip end surface of the diameter enlarged portion 33j flat, and a hemispherical portion 33l that protrudes toward the bottom portion 40a1 of the tubular potion 40a from the flat portion 33k. The hemispherical portion 331 is configured by the tip end of a pin shaped member 48 that is fitted into a hole portion 33k1 of the flat portion 33k. The same acting effects as described above are also obtained in the present embodiment. In addition, the hemispherical portion 331 may be formed to be integrated with the shaft member 33.

(d) The inlet 32C is provided on the lateral side of the lower housing 32b, and the outlet 32D is provided at the bottom side of the lower housing 32b. However, the inlet 32C and the outlet 32D may be exchanged with each other. In this case, in the above-described embodiment, the inlet 32C is replaced with the outlet 32D, and the outlet 32D is replaced with the inlet 32C.

(e) In the above-described embodiment, the fluid control valve used in the fuel cell system 1 has been described. However, the fluid control valve may be used as a fluid control valve for other vehicles or a fluid control valve for household appliances without specific limitation.

This disclosure may be used for a fluid control valve that controls a flow amount and a pressure of a fluid.

A feature of a fluid control valve resides in that the fluid control valve includes: a shaft member that moves along an axis of the shaft by a driving force from a driving source connected to one end of the shaft member; a holding member including a bottomed tubular portion into which the other end of the shaft member is inserted with a radial predetermined gap, and which has a recess formed to be recessed radially inward from a surface of the tubular portion, and a valve body formed by fixing a sealing member to an outer periphery of a flat plate shaped main body portion that extends radially outward from the tubular portion; a housing that includes an inlet and an outlet of a fluid, has an annular valve seat on which the valve body abuts to block a communication between the inlet and the outlet, and accommodates the shaft member and the holding member, wherein the other end of the shaft member includes a first region formed to be reduced in diameter toward a bottom portion of the tubular portion and including a first abutment portion abutting the bottom portion, and a second region formed to be reduced in diameter toward an opposite side to the bottom portion from a boundary surface with the first region and including a second abutment portion abutting the recess, and a distance from a center of the boundary surface to the first abutment portion is shorter than a distance from the center of the boundary surface to the second abutment portion.

In this configuration, in the other end of the shaft member, since the first region abuts on the bottom portion of the tubular portion, and the second region that is reduced in diameter toward the opposite side to the bottom portion of the tubular portion abuts on the recess formed in the tubular portion, the axial relative movement of the holding member with respect to the shaft member is regulated. In this state, since the shaft member is inserted into the tubular portion with the radial predetermined gap, the holding member having the valve body is capable of swinging with respect to the shaft member. As a result, when the axial driving force is applied to the shaft member such that the valve body is pressed against the valve seat, the valve body swings with respect to the shaft member, and the sealing member of the valve body is pressed against the valve seat over the entire circumference of the valve seat. Thus, the sealing performance may be improved even when the parallelism between the valve body and the valve seat is not constant.

Further, since the mechanism that causes the valve body to swing with respect to the shaft member may be merely the recess formed by lathe-machining the other end of the shaft member or press-processing the holding member, manufacturing costs may be reduced, as compared with the related art where the ball is provided. Further, since the other end of the shaft member is divided into the first and the second regions so that the axial dimension of the first region is reduced, the axial length of the fluid control valve may be shorten. As described above, the compact fluid control valve capable of assuring the sealing function with the simple configuration may be provided.

Another feature of the fluid control valve resides in that the second region is formed in a hemispherical shape.

When the second region is formed in a hemispherical shape as in the present configuration, the spherical surface and the recess smoothly come into sliding-contact with each other while the valve body swings with respect to the shaft member. Hence, when the axial driving force is applied to the shaft member such that the valve body is pressed against the valve seat, the posture of the valve body is reliably corrected to be parallel with the valve seat, and thus, the sealing performance may be improved.

Another feature of the fluid control valve resides in that an O-ring is provided between the shaft member and the tubular portion on the opposite side to the bottom portion from the second abutment portion.

When the O-ring is provided between the shaft member and the tubular portion on the opposite side to the bottom portion of the tubular portion from the second abutment portion as in the present configuration, foreign matters do not penetrate into the inside of the tubular portion, and thus, the swinging of the valve body with respect to the shaft member is not hindered by the foreign matters. As a result, the posture of the valve body may be corrected over a long period of time even when the valve body is repeatedly closed.

Another feature the fluid control valve resides in that the recess is configured as a caulked portion that is formed by caulking the tubular portion from the exterior of the tubular portion, and the inner peripheral surface of the recess and the second abutment portion are movable to slide on each other.

In this configuration, since the recess moving to slide on the second abutment portion may be formed by merely caulking the tubular portion from the exterior thereof, the machining is easy.

A feature of a fluid control valve resides in that the fluid control valve includes: a shaft member that moves along an axis of the shaft by a driving force from a driving source connected to one end of the shaft member; a holding member including a bottomed tubular portion into which the other end of the shaft member is inserted with a radial predetermined gap, and which has a recess formed to be recessed radially inward from a surface of the tubular portion, and a valve body formed by fixing a sealing member to an outer periphery of a flat plate shaped main body portion that extends radially outward from the tubular portion; a housing that includes an inlet and an outlet of a fluid, has an annular valve seat on which the valve body abuts to block a communication between the inlet and the outlet, and accommodates the shaft member and the holding member, wherein the other end of the shaft member includes a diameter enlarged portion that is enlarged in diameter toward the bottom portion of the tubular portion and abuts on the recess, and a flat portion that is formed by making a tip end surface of the diameter enlarged portion flat, and the bottom portion has a convex portion that protrudes toward the flat portion from a surface of the bottom portion and abuts on the flat portion.

In this configuration, in the other end of the shaft member, since the flat portion abuts on the convex portion of the bottom portion of the tubular portion, and the diameter enlarged portion that is enlarged in diameter toward the bottom portion of the tubular portion abuts on the recess formed in the tubular portion, the axial relative movement of the tubular portion with respect to the shaft member is regulated. In this state, since the shaft member is inserted into the tubular portion with a radial predetermined gap, the holding member having the valve body is capable of swinging with respect to the shaft member. As a result, when an axial driving force is applied to the shaft member such that the valve body is pressed against the valve seat, the valve body swings with respect to the shaft member, and thus, the sealing member of the valve body is pressed against the valve seat over the entire circumference. Thus, the sealing performance may be improved even when the parallelism between the valve body and the valve seat is not consistent.

Further, since the mechanism that causes the valve body to swing with respect to the shaft member may be merely the recess formed by lathe-machining the other end of the shaft member or press-processing the holding member, manufacturing costs may be reduced, as compared with the related art where the ball is provided. Further, since the tip end of the other end of the shaft member is formed on a flat surface, the axial length of the fluid control valve may be shortened. As described above, the compact fluid control valve capable of assuring the sealing function with the simple configuration may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fluid control valve comprising:
a shaft member that moves along an axis of the shaft by a driving force from a driving source connected to one end of the shaft member;
a holding member including a bottomed tubular portion into which the other end of the shaft member is inserted with a radial predetermined gap and which has a recess formed to be recessed radially inward from a surface of the tubular portion, and a valve body formed by fixing a sealing member to an outer periphery of a flat plate shaped main body portion that extends radially outward from the tubular portion;
a housing that includes an inlet and an outlet of a fluid, has an annular valve seat on which the valve body abuts to block a communication between the inlet and the outlet, and accommodates the shaft member and the holding member,
wherein the other end of the shaft member includes a first region formed to be reduced in diameter toward a bottom portion of the tubular portion and including a first abutment portion abutting the bottom portion, and a second region formed to be reduced in diameter toward an opposite side to the bottom portion from a boundary surface with the first region and including a second abutment portion abutting the recess, and
a distance from a center of the boundary surface to the first abutment portion is shorter than a distance from the center of the boundary surface to the second abutment portion.

2. The fluid control valve according to claim 1, wherein the second region is formed in a hemispherical shape.

3. The fluid control valve according to claim 1, wherein an O-ring is provided between the shaft member and the tubular portion on the opposite side to the bottom portion from the second abutment portion.

4. The fluid control valve according to claim 1, wherein the recess is configured as a caulked portion that is formed by caulking the tubular portion from an exterior of the tubular portion, and the inner peripheral surface of the recess and the second abutment portion are movable to slide on each other.

5. A fluid control valve comprising:
a shaft member that moves along an axis of the shaft by a driving force from a driving source connected to one end of the shaft member;
a holding member including a bottomed tubular portion into which the other end of the shaft member is inserted with a radial predetermined gap, and which has a recess formed to be recessed radially inward from a surface of the tubular portion, and a valve body formed by fixing a sealing member to an outer periphery of a flat plate shaped main body portion that extends radially outward from the tubular portion;
a housing that includes an inlet and an outlet of a fluid, has an annular valve seat on which the valve body abuts to block a communication between the inlet and the outlet, and accommodates the shaft member and the holding member,
wherein the other end of the shaft member includes a diameter enlarged portion that is enlarged in diameter toward the bottom portion of the tubular portion and abuts on the recess, and a flat portion that is formed by making a tip end surface of the diameter enlarged portion flat, and
the bottom portion has a convex portion that protrudes toward the flat portion from a surface of the bottom portion and abuts on the flat portion.

* * * * *